United States Patent [19]

McKewan

[11] 3,909,243
[45] Sept. 30, 1975

[54] RECOVERY OF BOTH BRASS AND ZINC FROM METALLURGICAL RESIDUES BY CARBON FLOTATION METHOD

[75] Inventor: William M. McKewan, Monroeville, Pa.

[73] Assignee: Roessing Bronze Company, Mars, Pa.

[22] Filed: Oct. 17, 1974

[21] Appl. No.: 515,529

Related U.S. Application Data

[63] Continuation of Ser. No. 328,590, Feb. 1, 1973, abandoned.

[52] U.S. Cl. .......................... 75/24; 75/63; 75/72; 75/73; 75/74; 75/88; 75/89
[51] Int. Cl.² ........................................ C21B 3/04
[58] Field of Search ............... 75/72, 73, 74, 75, 76, 75/63, 88, 89, 178, 24

[56] References Cited
UNITED STATES PATENTS

| | | | |
|---|---|---|---|
| 2,429,584 | 10/1947 | Poland | 75/63 |
| 2,598,741 | 6/1952 | Handwerk et al. | 75/72 |
| 2,715,062 | 8/1955 | Osborn | 75/24 |
| 3,017,261 | 1/1962 | Lumsden | 75/88 |
| 3,271,131 | 9/1966 | Dickey | 75/88 |
| 3,449,116 | 6/1969 | Derham | 75/88 |
| 3,632,334 | 1/1972 | Quintin | 75/63 |
| 3,669,647 | 6/1972 | Barbour | 75/72 |
| 3,682,623 | 8/1972 | Dierckx et al. | 75/72 |

OTHER PUBLICATIONS

Grant, J.; *Hackh's Chemical Dictionary;* New York, 1969, p. 109 (Brass).

*Primary Examiner*—Walter R. Satterfield
*Attorney, Agent, or Firm*—Gardiner, Sixbey, Bradford & Carlson

[57] ABSTRACT

A method of recovering both brass and zinc from metallurgical residue containing those metals and including slag containing zinc oxide, comprising charging the residue into a furnace, in such furnace heating the residue up to about 1,250° C., the brass which is molten at said temperature sinking to the bottom of the furnace, adding carbon reducing zinc oxide in the slag to zinc metal in vapor form, withdrawing and condensing the zinc vapor, tapping the molten slag from the furnace and tapping the molten brass from the furnace. Flux may be and normally is added to the residue to render the slag more fluid although under certain conditions addition of flux may be unnecessary. When flux is added it may comprise at least one of lime, silica, scrap glass, borax, rasorite and colemanite. The carbon reductant may comprise at least one of metallurgical coke, petroleum coke, bituminous coal, anthracite coal and graphite. The zinc vapor is withdrawn from the furnace through a first outlet passage, the slag after at least the greater portion of the zinc oxide therein has been reduced to zinc in vapor form is withdrawn from the furnace through a second outlet passage and the molten brass is withdrawn from the furnace through a third outlet passage. The furnace is preferably an electric arc furnace although a gas fired furnace or an induction furnace may be employed.

6 Claims, No Drawings

RECOVERY OF BOTH BRASS AND ZINC FROM METALLURGICAL RESIDUES BY CARBON FLOTATION METHOD

This is a continuation, of application Ser. No. 328,590 filed Feb. 1, 1973, and now abandoned.

This invention relates to the recovery of both brass and zinc from metallurgical residues, specifically metallurgical residues containing those metals and including slag containing zinc oxide. Examples of metallurgical residues from which both brass and zinc may be recovered according to my invention are skimmings from brass melting furnaces, skimmings from brass alloying furnaces, slag from brass smelting furnaces, slag from brass refining furnaces, zinc containing slag from copper refineries, zinc containing slag from copper smelters, etc.

Heretofore the treatment of residues such as those above referred to did not effect recovery of both brass and zinc. One procedure was to treat the residue in a copper refinery in which only the copper metal present was recovered. In that case all of the zinc was lost, both the zinc in the slag as zinc oxide and the zinc metal contained in the metallic brass present. Another procedure was to treat the residue in a brass smelter. In that treatment the residue mixed with flux was melted to form a fluid slag that allowed the metallic brass contained in the residue to coalesce and fall through the fluid slag and form a metal layer. That procedure recovered the metallic brass but the zinc in the form of zinc oxide in the slag was still lost when the slag was discarded.

I accomplish the recovery of both brass and zinc from metallurgical residues of the types above referred to. I provide a method of recovering both brass and zinc from metallurgical residue containing those metals and including slag containing zinc oxide, comprising charging the residue into a furnace, in such furnace heating the residue up to about 1250° C., the brass which is molten at said temperature sinking to the bottom of the furnace, adding carbon reducing zinc oxide in the slag to zinc metal in vapor form, withdrawing and condensing the zinc vapor, tapping the molten slag from the furnace and tapping the molten brass from the furnace. Flux may be and normally is added to the residue to render the slag more fluid although under certain conditions addition of flux may be unnecessary. When flux is added it may comprise at least one of lime, silica, scrap glass, borax, rasorite and colemanite. The carbon reductant may comprise at least one of metallurgical coke, petroleum coke, bituminous coal, anthracite coal and graphite. The zinc vapor is withdrawn from the furnace through a first outlet passage, the slag after at least the greater portion of the zinc oxide therein has been reduced to zinc in vapor form is withdrawn from the furnace through a second outlet passage and the molten brass is withdrawn from the furnace through a third outlet passage. The furnace is preferably an electric arc furnace although a gas fired furnace or an induction furnace may be employed.

Examples of specific metallurgical residues from which both brass and zinc may be recovered in accordance with my invention are slag from a brass smelter, which slag is about 15% metallic brass and 85% slag containing zinc as zinc oxide, skimmings from a brass melting furnace, which skimmings are approximately 50% metallic brass and 50% slag containing zinc as zinc oxide and tailings from a brass concentrating mill, which tailings consist of about 1.5% metallic brass with the remainder being a slag residue containing about 35% zinc in the form of zinc oxide.

The mix containing the zinc bearing residue, the carbonaceous reductant and flux if necessary may be charged into an electric arc furnace. After melting to form a fluid slag the contained metallics such as copper, brass, etc., will sink through the slag to the bottom of the furnace. A metal layer will then form underneath the slag layer. The carbonaceous reductant floating on top of the slag will reduce the zinc oxide in the slag forming zinc vapor and carbon monoxide gas. The furnace gases containing the zinc vapor exit the furnace through convenient ports. The zinc vapor is then condensed by one of the usual metallurgical processes into massive zinc metal. The charge mix is added to the top of the slag bath periodically. At selected time intervals the slag and metal are tapped from the furnace separately. The zinc vapor is generated and removed continuously.

The electrodes of the electric arc furnace will normally be submerged in the slag layer and the furnace will operate using the slag as a resistance heater. If under certain circumstances the slag has too high a resistance a carbonaceous layer is placed on top of the slag. As the carbon has less resistance than the slag more electric current will flow through the carbon giving more heat to the furnace. It is also possible to operate with the electrodes above the slag bath arcing to the bath, thus heating the charge by radiation from the arc.

The feasibility of my invention is demonstrated by the following described procedure. A zinc-bearing slag residue from a brass smelting furnace was analyzed and found to contain 33.45% zinc and 1.34% copper. Eighteen pounds of this material was charged into a cylindrical graphite crucible 8.5 inches deep and 7 inches in internal diameter. The crucible was placed in an induction furnace and the charge was melted down at a power of 30 kilowatts. Two pounds of anthracite coal was added to the charge and the power was dropped to 10 kilowatts. The zinc oxide in the slag was reduced to zinc, vaporized and allowed to escape the furnace. The final composition of the slag was 1.12% zinc and 0.23% copper. Several tests of this residue were carried out in the manner just described. The final slags were found to contain 0.71%, 0.15% and 0.24% zinc and 0.22%, 0.05% and less than 0.01% copper, respectively. Such tests demonstrate that zinc can be removed from slag residues of the type in question by employing my invention.

Other tests were carried out on skimmings from a brass smelting furnace. These skimmings analyzed 46.9% zinc and 38.5% copper and contained both slag and metal. The metallic portion was in the form of droplets of brass and analyzed 20.2% zinc and 75.5% copper. The skimmings were 51% metallic. The non-metallic portion analyzed 74.6% zinc. Eight pounds of skimmings together with two pounds of anhydrous rasorite as a flux were placed together in a clay-graphite crucible. The crucible was placed in a gas fired pot furnace. When the charge was melted one pound of anthracite coal was added. The temperature was about 1,250° C. The zinc in the slag was fumed off continuously. At the conclusion of the test 3.69 pounds of metallics was removed and analyzed and found to contain 83.5% copper and 11.2% zinc. The slag formed was analyzed and found to contain 1.25% zinc. A similar test showed a final slag analysis of 0.64% zinc. This means that about 99% of the zinc in the slag portion of the charge was removed by reduction and vaporization. Thus the usefulness of my invention for recovering zinc from brass mill skimmings was demonstrated.

While I have described certain present preferred methods of practicing the invention it is to be distinctly understood that the invention is not limited thereto but may be otherwise variously practiced within the scope of the following claims.

I claim:

1. A continuous method of recovering both metallic brass and metallic zinc from residues containing brass in the amount of from at least 1.5% of the contents of said residue and zinc oxide in amounts of at least 20% of the balance of said residue, said residue being comprised of slags or melting furnace skimmings and admixtures thereof, comprising the steps of periodically charging the residue into a furnace; melting and heating said residue up to a temperature of about 1250° C., said molten brass sinking to the bottom of the furnace; periodically adding carbon to the surface of the molten bath in free floating form in an amount sufficient to reduce the zinc oxide content of said balance of said slag to zinc in vapor form; continually withdrawing and condensing said zinc in vapor form to metallic zinc; periodically tapping the molten brass from said furance and periodically removing the zinc exhausted slag from said furnace at a final zinc oxide content approaching 0.15%, the rate of addition of said charging residue and said carbon and the rate of withdrawing of said vaporized zinc, said brass and said spent slag being such as to maintain a metal pool, a slag layer and free floating carbon at all times in said furnace at temperature of about 1250° C.

2. A method as claimed in claim 1 wherein flux of at least one of the class comprised of lime, silica, scrap glass, borax, rasorite and colemonite is added to the furnace for fluidity purposes.

3. The method as defined in claim 1 in which the carbon is at least one of the forms of metallurgical coke, petroluem coke, bituminous coal, anthracite coal and graphite.

4. The method as defined in claim 2 in which the carbon is at least of one of the forms of metallurgical coke, petroleum coke, bituminous coal, anthracite coal and graphite.

5. A method as defined in claim 1 in which the zinc vapor is withdrawn from the furnace through a first outlet passage; the slag, after at least the greater portion of the zinc oxide has been reduced to zinc in vapor form is withdrawn through a second and independent outlet passage and said brass is withdrawn from the furnace from a third independent outlet.

6. A method as defined in claim 5 wherein said zinc vapor is subsequently condensed in the presence of carbon monoxide gas generated from reduction of said zinc oxide.

* * * * *